March 22, 1938.  L. MALTER  2,112,037
VACUUM DIFFUSION PUMP
Filed March 27, 1937
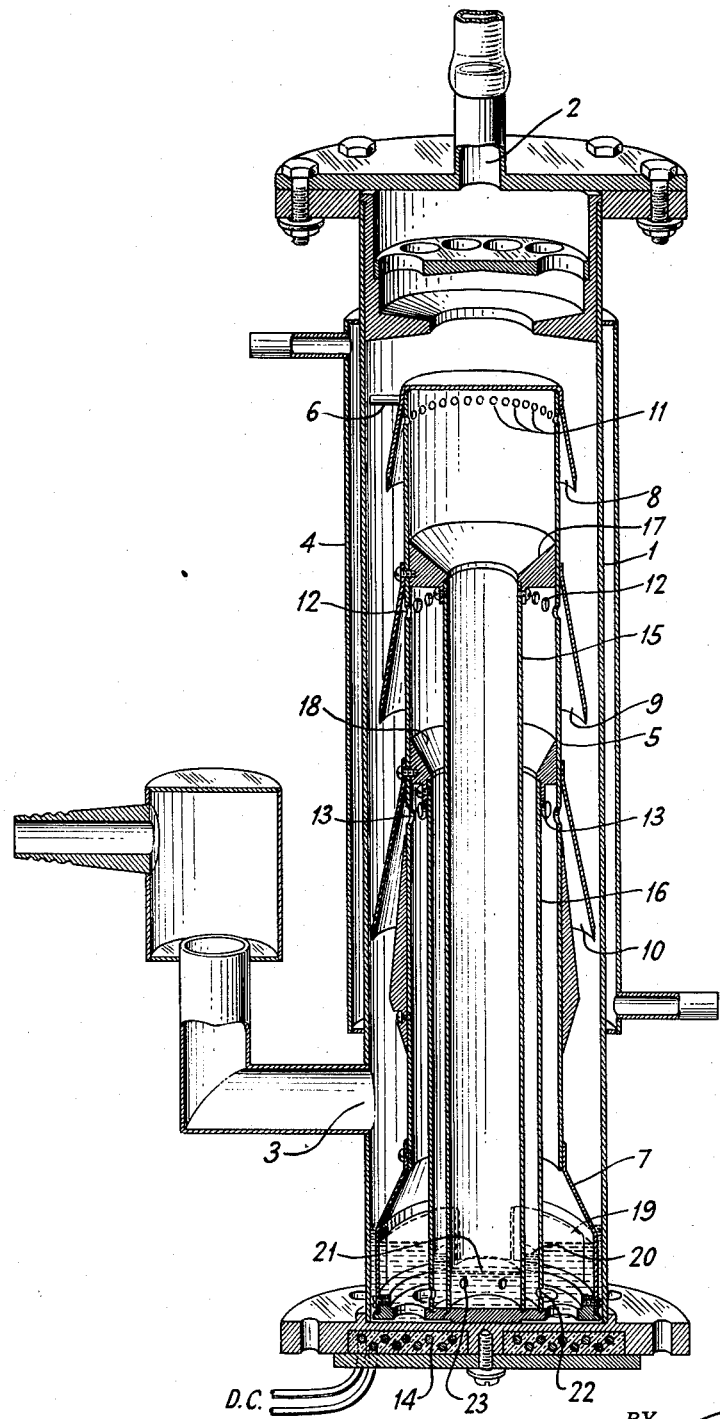
INVENTOR
LOUIS MALTER
BY Charles McClair
ATTORNEY Patented Mar. 22, 1938

2,112,037

UNITED STATES PATENT OFFICE 2,112,037

VACUUM DIFFUSION PUMP

Louis Malter, West Orange, N. J., assignor, by mesne assignments, to Radio Corporation of America, New York, N. Y., a corporation of Delaware Application March 27, 1937, Serial No. 133,299

3 Claims. (Cl. 230—101)

My invention relates to pumping devices, particularly pumps of the vapor diffusion type for producing high vacuum.

The usual diffusion pump comprises a chamber connected to the envelope to be exhausted and containing a nozzle so directed that vapor ejected by the nozzle entrains gas molecules entering the chamber and expels them in the outlet port of the chamber. The minimum pressure obtainable at the inlet port of such a pump is limited to the vapor pressure of the most volatile constituent of the liquid from which the entraining vapor of the jet is generated. Certain oils have been employed as the working or pumping fluid, care being taken to distill away the more volatile constituents of the oil before its introduction in the pump. Unfortunately the purest oils obtainable accumulate during manufacture and use, contaminating constituents and impurities of a volatility that reduces the degree of vacuum that can be produced.

The object of my invention is to make a diffusion pump capable of producing, with commercial pumping fluids, an extremely high vacuum.

Specifically the object of my invention is to make a diffusion pump capable of producing a degree of vacuum that is limited only by the vapor pressure of the least volatile constituent of the pumping fluid.

One embodiment of my invention comprises a cylindrical pumping chamber with an inlet port and an outlet port and containing a plurality of nozzles arranged in cascade between the inlet and outlet ports and each pointing in the same direction. Each nozzle communicates through an individual conduit to a vapor generator which is constructed to fractionate the pumping fluid and admit to the conduit of each nozzle only vapor of a predetermined volatility. The nozzle nearest the outlet port of the chamber receives vapors of the most volatile constituent, while the nozzle adjacent the inlet port receives only the vapors of the least volatile constituent. The degree of vacuum produced at the inlet port of my novel pump is accordingly determined by the vapor pressure of the most phlegmatic constituent of the pumping fluid. The conduits are concentric tubes communicating at their ends with the vapor generator and the nozzles and coaxially arranged in the cylindrical pump chamber. The structure hereinafter described is easy to make, efficient in operation, and sturdy in construction.

The invention is defined with particularity in the appended claims and one embodiment thereof is described in the following specification and in the accompanying drawing in which the figure shows in sectioned perspective view one form of my invention.

Chamber 1 of my novel diffusion pump communicates through an inlet port 2 at its upper end with the envelope to be evacuated and communicates at its lower end through outlet port 3 with a condensing chamber and a preliminary or so-called rough pump. The chamber is cooled by a flow of water within cooling jacket 4 connected to inlet and outlet nipples at the upper and lower ends, respectively, of the jacket. Cylinder 5 positioned concentrically inside the chamber and spaced at the upper end with fingers 6 and supported at the lower end upon an apertured tubular member 7 resting on the bottom plate of the chamber, carries three nozzles 8, 9, and 10. Each nozzle comprises a conical skirt attached at its small end to the cylinder, with the lower end held in predetermined spaced relation from the inner wall of the chamber. Rows of openings 11, 12, and 13 in the cylinder wall just below the junction of the conical skirts with the cylinder permits vapor to flow from within the cylinder through the openings and downwardly substantially parallel to the axis of the chamber. Gas molecules entering the chamber from the top are entrained by the three downwardly directed vapor jets and impelled toward the exhaust port. The vapors condense upon the cooled chamber wall, releasing the gas molecules which are withdrawn through the exhaust port, and drain to the sump at the bottom of the chamber. Baffles may be placed near the inlet port to prevent vapor in the chamber from entering the inlet port.

My novel pumping device is constructed to fractionally distill the fluid in the bottom of the chamber and selectively supply the different fractions to the different nozzles so that only the most phlegmatic constituents are admitted to the upper nozzle in the vacuum end of the chamber, the more volatile constituents being directed to the lower nozzles. The pumping fluid at the bottom of the chamber is heated, in the embodiment illustrated, by a resistance heating element 14 to vaporize the liquid and return it to the nozzles. Tubes 15 and 16 within the cylinder are spaced at their upper ends by rings 17 and 18 from the wall of the cylinder and are set in liquid tight contact with the bottom plate of the chamber to divide the lower end of the pump into three concentric vapor generating compartments 19, 20 and 21. Concentric grooves may conveniently be machined in the bottom plate to receive the ends of the tubes. The only communicating openings between adjoining compartments are constricted passages shown as small holes 22 and 23 made in the lower end of each of tubes 15 and 16 to permit the pumping fluid to slowly flow from the outer compartment into the annular space between tubes 15 and 16 and hence into tube 15. These holes may be four in number and are preferably offset or staggered to increase the length of path from the outer to the inner compartment. The temperature of the bottom plate of the chamber, which may be perforated to bring the pumping fluid into direct contact with heating plate of unit 14, and the rate of flow from one compartment to the next is so regulated by the size of the holes that the rate of flow of pumping fluid from the outer to the inner compartments is commensurate with the rate of vaporization of the fluid in the compartments and the most volatile constituents of the pumping fluid drained from the chamber wall has sufficient time to vaporize in the outer compartment and be conducted away to the lower nozzle 10 before these constituents may flow into compartment 20. Only those constituents of intermediate and low volatility reach compartment 20. The rate of evaporation in compartment 20 and the rate of flow into compartment 21 may likewise be regulated so that only constituents of the lowest volatility reach compartment 21. Hence, the constituents of intermediate and lowest volatility are directed respectively to nozzles 9 and 8.

To place in operation, the desired pumping fluid is placed in the pump, the inlet port is connected to the envelope to be evacuated, the outlet port connected preferably to a preliminary or rough pump, cooling water is circulated in jacket 4, and the temperature of the bottom plate of the chamber raised to a point slightly above the vaporization temperature of the most phlegmatic constituent of the pumping fluid. Jets of vapor of relatively high velocity are directed downwardly by nozzles 8, 9, and 10, each nozzle receiving only the desired constituents of the pumping fluid. The pumping vapor with the entrained gas molecules condenses on the cool chamber walls releasing the molecules to the outlet port, and drains to the bottom of the chamber, where the condensate is heated and fractional distillation continues. It has been found that with a pumping chamber about 14 inches long and 3½ inches in diameter containing about 100 c. c. of pumping fluid commercially known as Octoil may produce at the inlet port a pressure of $7 \times 10^{-5}$ microns. A similar pump with the same working fluid but without means for fractionating the working fluid in operation has been found to be capable of producing only a vacuum of about $5 \times 10^{-4}$ microns. Contamination of the oil after a considerable period of use in my improved pump has been found produces at the inlet port a pressure of about $4 \times 10^{-4}$ microns, compared to a pressure of about $2 \times 10^{-5}$ for the standard pump.

Numerous structural modifications may be made in the novel diffusion pump described without departing from the scope of my invention. The particular arrangement of baffles in the upper end of the pump chamber for preventing the pumping vapor from entering the inlet port may be modified in any desired manner and the specific dimensions and shape of the nozzles may be altered within the scope of my invention. The vacuum pump herein described is efficient in operation, is easy to make and sturdy in construction.

I claim:

1. A multi-stage vacuum pump comprising in combination a cylindrical chamber with an inlet port at its upper end and an outlet port near its lower end, a pool of pumping fluid below said outlet port, a heating device at said lower end to heat said fluid to vaporization temperature, a cylinder concentric with said chamber, a plurality of downwardly directed vapor jet nozzles spaced longitudinally along said cylinder between said ports and comprising conical skirts attached at their smaller ends to the cylinder, a plurality of tubes inside and concentric with said cylinder selectively communicating with said plurality of nozzles and terminating on the bottom of said chamber in a plurality of concentric compartments, and fluid passages below said outlet port between adjoining compartments, said passages being constricted to limit the flow of fluid from the outer to the inner compartments to a rate commensurate with the rate of vaporization of said fluid in the compartments.

2. A vacuum pump comprising a tubular chamber with an outlet port near the lower end and an inlet port above the outlet port, a cylinder telescoped within said chamber and spaced inwardly from the walls of the chamber, a plurality of downwardly directed nozzles carried on said cylinder between the inlet and outlet ports, a plurality of tubes concentric with and inside said cylinder, each tube communicating at its upper end with one of said nozzles, concentric compartments formed by said cylinder and tubes in the chamber below said outlet port, constricted fluid passages between adjoining compartments to limit the flow of fluid from one compartment to the next, and means for heating the lower end of said chamber to selectively vaporize different constituents of the pumping fluid in the different compartments.

3. A vacuum pump comprising a tubular chamber with an outlet port near the lower end and an inlet port above the outlet port, means to heat the lower end of the tubular chamber, a plurality of nozzles mounted one above the other between said ports and directed toward said outlet port, a plurality of concentric conduits, each communicating at its upper end with one of said nozzles and terminating at the bottom of said chamber to form a plurality of compartments in the chamber below the outlet port, and constricted fluid passages between adjoining compartments.

LOUIS MALTER.